United States Patent [19]
Delisle et al.

[11] 3,807,772
[45] Apr. 30, 1974

[54] DEVICE FOR PROVIDING A TIGHT SEAL BETWEEN TWO FLUIDS AT DIFFERENT TEMPERATURES

[75] Inventors: Jean-Paul Delisle, Manosque; Michel Sauvage, Aix en Provence, both of France

[73] Assignee: Commissariat A L'Energie Atomique, Paris, France

[22] Filed: Apr. 11, 1972

[21] Appl. No.: 242,958

[30] Foreign Application Priority Data
Apr. 16, 1971   France .............................. 71.13646

[52] U.S. Cl...................... 285/41, 285/47, 285/187, 285/370
[51] Int. Cl............................................. F16l 53/00
[58] Field of Search ............ 285/41, 187, 165, 166, 285/47, 138, 370; 165/157; 176/72

[56] References Cited
UNITED STATES PATENTS
2,998,270    8/1961    Watkins.......................... 285/187 X
3,507,522    4/1970    Froman et al. ................. 285/187 X
3,525,669    8/1970    Germer................................. 176/52

FOREIGN PATENTS OR APPLICATIONS
252,201    10/1948    Switzerland......................... 285/138

Primary Examiner—Dave W. Arola

[57] ABSTRACT

The device provides a tight seal between a "hot" fluid circulating within a connecting tube between two enclosures and a "cold" fluid circulating externally of the connecting tube. A spherical collar provided at each end of the tube is maintained at the temperature of the hot fluid and engages freely within one of two sleeves which are slightly larger in diameter than the spherical collars, are rigidly fixed to the wall of each enclosure and maintained at the temperature of the cold fluid. The spherical collars permit small displacements of the tube with respect to the enclosures.

4 Claims, 2 Drawing Figures

PATENTED APR 30 1974    3,807,772

DEVICE FOR PROVIDING A TIGHT SEAL BETWEEN TWO FLUIDS AT DIFFERENT TEMPERATURES

The present invention has for its object a device for providing a tight seal between a "hot" fluid which circulates within a connecting tube between two enclosures and a "cold" fluid which circulates externally of said tube. More precisely, it often proves desirable to establish a connection by means of a tube between two enclosures containing a fluid, the complete system being surrounded by a liquid medium at a lower temperature. This is the case in particular with integrated fast reactors in which the liquid sodium, after having circulated within the reactor core, is stored in a primary vessel and delivered through ducts from said vessel to heat exchangers, the entire assembly being immersed in so-called cold sodium. The temperature gradient which exists between the different walls prevents the use of simple welded pipes, hence the need to employ a special device between the pipes and the enclosures for absorbing axial and radial expansions.

One possible design solution consists in making use of expansion compensators (usually bellows elements). However, in the event of failure of these compensators, it is difficult to take remedial action under certain circumstances and disassembly is a delicate operation.

The precise object of the present invention is to provide a device which overcomes the disadvantages of the design solution mentioned in the foregoing.

The device under consideration is characterized in that a spherical collar is provided at each end of said tube, each spherical collar being maintained at the temperature of the hot fluid and adapted to engage freely within one of two sleeves which are slightly larger in diameter than the spherical collars, said sleeves being rigidly fixed to the wall of each of said enclosures and maintained at the temperature of the cold fluid, said spherical collars being intended to permit small displacements of said tube with respect to said enclosures.

One of the advantages of the device according to the invention lies in the fact that a tight seal between the "hot" fluid and the "cold" fluid is obtained automatically by means of a clamping action under the influence of a temperature difference between these two fluids, said clamping action being produced as a result of differential expansion between the spherical collars and the sleeves.

In accordance with an alternative form of construction of the present invention, a tight seal is obtained by virtue of a binding hoop placed on each sleeve; this alternative form of construction is of special interest in the event that the two fluids are at temperatures of closely related value since, in this case, the effect of differential expansion between the tube and the sleeves is insufficient to ensure leak-tightness.

A clearer understanding of the invention will in any case be obtained from the following description of one embodiment of the invention which is given by way of non-limitative example, reference being made to the accompanying figures, in which.

This description relates to the case in which the sealing device is applied to a sodium-cooled fast reactor of the type comprising integrated heat exchangers.

Figure 1:
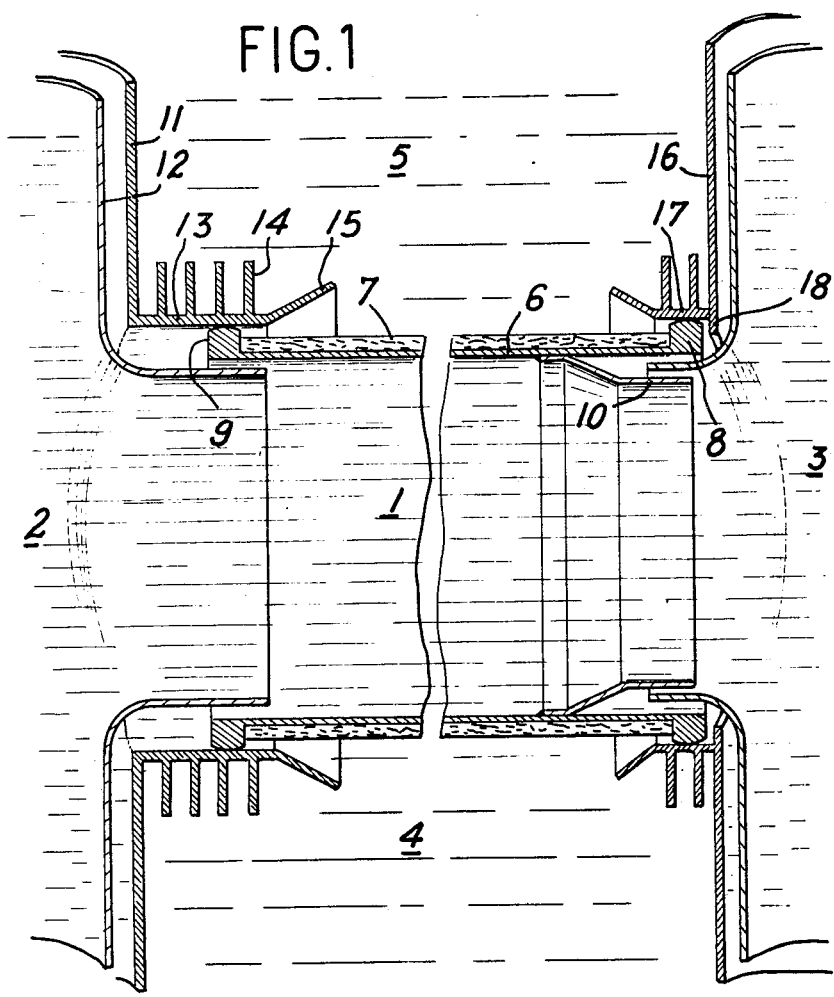
FIG. 1 is an axial sectional view of the sealing device according to the invention.

There is shown at 1 in FIG. 1 the tube which provides a connection between the primary vessel 2 containing the reactor core (not shown in the figure) and the heat-exchanger enclosure 3, the hot sodium being clearly intended to flow from the primary vessel 2 towards the heat exchanger 3; the spaces 4 and 5 which surround the tube 1, the vessel 2 and the heat-exchanger enclosure 3 are surrounded by cold sodium. As shown in the drawings, the walls 6 of the tube 1 are provided with an outer covering of heat-insulating material 7. It is also shown that a spherical collar is formed at each end of the tube 1, namely respectively the collars 8 and 9 in FIG. 1. Provision is made at that end of the tube 1 which is located nearest the enclosure 3 for a deflector 10 which is oriented in the direction of flow and placed within the interior of the tube 1.

The wall 11 of the primary vessel 2 which is covered internally with a heat-insulating lining 12 is fitted with a sleeve 13 which is slightly smaller in diameter than the spherical collars 8 and 9 and on which provision may be made for cooling fins 14 as shown in the figure and for a cone 15 in which the tube 1 is intended to be inserted. The wall 16 of the heat exchanger 3 together with its sleeve 17 is identical with the wall of the primary vessel 2; however, said wall 16 is additionally provided with an annular stop 18 for the tube 1.

When the device is in service, the relative displacements of the two enclosures 2 and 3 are absorbed by the possible displacements of the tube with respect to the enclosures 2 and 3. The relative movements of the enclosures 2 and 3 along the axis of the tube 1 have the effect of causing the tube 1 to slide with respect to the sleeve 13 while being aplied against the stop 18. The relative movements of the enclosures 2 and 3 along a plane at right angles to the axis of the tube are absorbed by the pivotal motion of the spherical collars 8 and 9 with respect to the sleeves 13 and 17.

The wall 6 of the tube 1 is maintained at the temperature of the hot sodium by virtue of its external heat-insulating covering 7. On the contrary, the sleeves 13 and 17 are brought to the temperature of the cold sodium by virtue of their cooling fins 14 and by virtue of the internal heat-insulating elements 12 of the walls 11 and 16 of the enclosures 2 and 3. A clamping action of the spherical collars 8 and 9 against the sleeves 13 and 17 is thus obtained by differential expansion between the spherical collars 8 and 9 and the sleeves 13 and 17. It is apparent that this clamping action and therefore the leak-tightness obtained is better as the temperature difference between the two fluids is greater. A sleeve 10 performs the function of deflector.

By way of example in a particular type of fast reactor, the hot sodium is at a temperature of 560° C whereas the cold sodium is at a temperature of 400° C.

At the time of assembly, the sleeves and the tube are at the same temperature and the tube 1 can readily be inserted into the sleeves, this insertion being facilitated to an even greater extent by the presence of two cones 15 for the engagement of the tube 1. Provision is also necessarily made for a slight leakage between the tube and the sleeves. The leakage flow rate can be adjusted by choosing a suitable clearance between the sleeve and the spherical collar when these latter are in the cold state.

In order to carry out maintenance work on the tube, it is only necessary to make the assembly isothermal, in which case a clearance is provided between the tube and the sleeves and disassembly can be readily performed.

It is self-evident that the presence of the cooling fins 14 is not indispensable and that said fins may be dispensed with if a substantial temperature difference exists between the two fluids.

Figure 2:
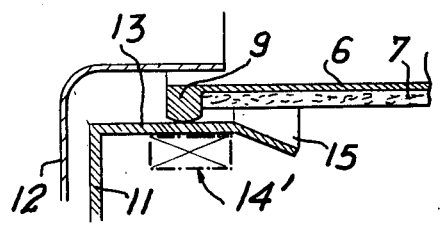
FIG. 2 is an alternative form of construction of the same device, this view being taken along the same sectional plane.

If the temperature difference between the hot sodium and the cold sodium is very small or even zero, the differential expansion between the tube 1 and the sleeves 13 and 17 is negligible and the clearance between the tube 1 and the sleeves 13 and 17 is substantial, thus resulting in a leakage flow from the hot sodium towards the cold sodium. If the hot sodium is at a high pressure, the leakage flow rate can become incompatible with the good operation of the installation. A remedy for this is found by adopting an alternative form of construction of the device hereinabove described, as shown in cross-section in FIG. 2. This alternative arrangement consists in replacing the cooling fins 14 of the sleeves 13 and 17 by a binding hoop 14' which is placed around each sleeve 13 and 17, the binding hoop 14' being fabricated from a material having a coefficient of expansion with temperature rise which is lower than that of the material constituting the sleeves and especially the tube. Said binding hoops 14' prevent the expansion of the sleeves 13 and 17 and thus produce a clamping action of the tube 1 within the interior of said sleeves. For purposes of disassembly, it is only necessary to reduce the temperature of the complete assembly in order that a clearance should again be provided between the tube 1 and the sleeves 13 and 17.

By way of example, the sleeves and the tube can be fabricated from austenitic stainless steel designated by the numerical standard 316 whilst the binding hoop 14' can be formed of an alloy known as "Fluginox" having a base of nickel, cobalt, chromium and molybdenum, the carbon content being 0.22 percent and the chromium content being 11 percent.

It is readily apparent that the invention is not limited solely to the mode of application which has been described by way of explanation with reference to the accompanying drawings and that the scope of this patent also extends to all alternative forms. In particular, the sealing device is not limited to the case of sodium and the use of any different type of "hot" fluid and "cold" fluid can thus be considered.

What we claim is:

1. A device providing a tight seal between a first fluid which circulates within a connecting tube between two enclosures and a second fluid which circulates externally around and in contact with said tube, each enclosure including a sleeve, the first fluid having a temperature at least equal to the temperature of the second fluid, comprising a spherical collar sealingly attached at each end of the tube, each spherical collar engaging in fluid tight relation freely within one of the two sleeves, said sleeves being sealingly rigidly fixed to the wall of each of the enclosures, means on the tube for maintaining the tube wall at the temperature of the first fluid, and means on said sleeves for maintaining them at the temperature of the second fluid.

2. A device according to claim 1, wherein the outer face of the tube and the internal walls of the enclosures and of the sleeves are covered with heat-insulating material.

3. A device according to claim 1, wherein said means on said sleeves are cooling fins.

4. A device according to claim 1 including an external binding hoop around each of said sleeves which expands under the action of heat to a lesser extent than said tube.

* * * * *